United States Patent
Hwang et al.

(10) Patent No.: US 11,745,898 B2
(45) Date of Patent: Sep. 5, 2023

(54) DOCKING SYSTEM FOR DRONES AND METHOD FOR OPERATING THE SAME

(71) Applicants: HYUNDAI MOTOR COMPANY, Seoul (KR); KIA MOTORS CORPORATION, Seoul (KR)

(72) Inventors: Jin Ho Hwang, Cheonan-si (KR); Dong Eun Cha, Hwaseong-si (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 120 days.

(21) Appl. No.: 17/166,537

(22) Filed: Feb. 3, 2021

(65) Prior Publication Data

US 2022/0111975 A1    Apr. 14, 2022

(30) Foreign Application Priority Data

Oct. 14, 2020    (KR) .................. 10-2020-0132702

(51) Int. Cl.
| | |
|---|---|
| *B64F 1/12* | (2006.01) |
| *B64C 25/32* | (2006.01) |
| *B64C 39/02* | (2023.01) |
| *B64U 70/00* | (2023.01) |

(52) U.S. Cl.
CPC .............. *B64F 1/12* (2013.01); *B64C 25/32* (2013.01); *B64C 39/024* (2013.01); *B64U 70/00* (2023.01)

(58) Field of Classification Search
CPC .... B64F 1/00; B64F 1/12; B64F 1/125; B64F 1/14; B64C 2201/18; B64C 2201/182; B64C 25/32; B64C 39/022; B64C 2025/325; B64U 70/00; B64U 70/30
See application file for complete search history.

(56) References Cited

U.S. PATENT DOCUMENTS

| | | | | |
|---|---|---|---|---|
| 3,069,118 | A * | 12/1962 | Bernard | B64F 1/027 244/23 R |
| 4,488,693 | A * | 12/1984 | Brandt | B64F 1/12 244/50 |
| 9,969,495 | B2 | 5/2018 | Gil | |
| 2017/0038778 | A1* | 2/2017 | Wang | B64C 25/001 |
| 2018/0039286 | A1* | 2/2018 | Tirpak | G05D 1/0094 |
| 2019/0077518 | A1* | 3/2019 | Williamson | B64F 1/08 |
| 2019/0161190 | A1* | 5/2019 | Gil | H04W 4/70 |
| 2021/0224739 | A1* | 7/2021 | Sweeny | G06Q 10/083 |

FOREIGN PATENT DOCUMENTS

| | | | |
|---|---|---|---|
| FR | 3059636 | A1 * | 6/2018 |
| KR | 20160065718 | A | 6/2016 |
| KR | 20170022805 | A | 3/2017 |
| KR | 20180065760 | A | 6/2018 |

* cited by examiner

*Primary Examiner* — Joshua J Michener
*Assistant Examiner* — Arfan Y. Sinaki
(74) *Attorney, Agent, or Firm* — LEMPIA SUMMERFIELD KATZ LLC

(57) ABSTRACT

A docking system for drones and a method for operating the same include: a seat part configured to land a drone thereon; a wire provided on the seat part and configured to allow the landing drone to be hung on the wire so that the drone may land on the seat part; and tension adjusters configured to adjust tension of the wire so as to allow the drone to land at a target position of the seat part when the drone is hung on the wire.

14 Claims, 4 Drawing Sheets

DOCKING SYSTEM FOR DRONES AND METHOD FOR OPERATING THE SAME

CROSS-REFERENCE TO RELATED APPLICATION

This application claims priority to Korean Patent Application No. 10-2020-0132702, filed on Oct. 14, 2020 in the Korean Intellectual Property Office, the disclosure of which is incorporated herein by reference in its entirety.

BACKGROUND

1. Field of the Disclosure

The present disclosure relates to a docking system for drones that adjusts the tension of a wire provided on a seat part using tension adjusters so that, when a drone is hung on the wire, the drone lands at a target position of the seat part.

2. Description of the Related Art

As drone-related technologies are being recently and actively developed, not only takeoff of drones but also landing of drones has become an issue. In general, a drone lands using a landing gear provided as a part of the drone. The drone is not difficult to land in a wide area in general weather conditions but is difficult to accurately control if the drone is intended to land at a specific precise position or if the drone is required to communicate with a landing point.

Here, technology is being developed that may land a drone precisely at a desired point of a moving object, such as a vehicle, as well as at a specific fixed point, and may fix the drone to the landing point even after operation of the drone is stopped.

The above information disclosed in the Background section is only to enhance understanding of the background of the disclosure and should not be interpreted as conventional technology that is already known to those having ordinary skill in the art.

SUMMARY

Therefore, the present disclosure has been made in view of the above problems. It is an object of the present disclosure to provide a docking system for drones in which: a seat part is provided at a specific fixed point or a specific moving point, such as a vehicle; a drone is hung on a wire provided on the seat part when the drone lands on the seat part; tension adjusters adjust the tension of the wire so as to allow the drone to land at a target position of the seat part when the drone is hung on the wire; and the drone is fixed to the seat part using magnetic force. It is another object of the present disclosure to provide a method for operating the same.

In accordance with an aspect of the present disclosure, the above and other objects can be accomplished by the provision of a docking system for drones. The docking system includes: a seat part configured to land a drone thereon; a wire provided on the seat part and configured to allow the landing drone to be hung on the wire so that the drone may land on the seat part; and tension adjusters configured to adjust tension of the wire so as to allow the drone to land at a target position of the seat part when the drone is hung on the wire.

The docking system for drones may further include a controller configured to control the drone or to provide the drone with information necessary to land the drone so as to allow the drone to land on the seat part through the tension adjusters, when the drone lands.

When the drone lands, respective parts of a landing gear may be extended and hung on the wire so that the drone lands on the seat part.

When the drone takes off, the wire on which the parts of the landing gear are hung may be released from the parts of the landing gear so that the drone takes off from the seat part.

Each of the tension adjusters may include a tension sensor configured to measure the tension of the wire. A motor may be configured to wind the wire on the tension adjuster depending on the measured tension of the wire.

A magnetic unit may be provided in the seat part and the magnetic unit may lock the drone to the seat part when the drone lands at the target position.

Fixing parts, which may be configured such that respective parts of a landing gear of the drone come into contact therewith, may be provided at the target position of the seat part. The landing gear of the drone and the fixing parts may be formed of a material having magnetism and the magnetic unit may be disposed to turn towards the fixing parts so as to form a magnetic flux path.

The parts of the landing gear of the drone may be locked to the fixing parts when the magnetic flux path is formed along the magnetic unit, the landing gear of the drone, and the fixing parts. The parts of the landing gear of the drone may be unlocked from the fixing parts when the magnetic flux path is formed in the magnetic unit alone.

An electromagnetic sensor configured to measure voltage due to the magnetic flux path and a locking checking unit configured to determine that the drone is locked normally at the target position when the measured voltage satisfies a designated reference level may be provided in the magnetic unit or the fixing parts.

A through hole configured to be selectively opened may be formed in the target position of the seat part. When the drone lands at the target position of the seat part, a battery of the drone may be replaced, or an object transported by the drone may be replaced.

A width of the through hole may be less than a distance between respective parts of a landing gear of the drone. The battery of the drone or the object transported by the drone may be replaced between the parts of the landing gear of the drone.

The seat part may be provided on a roof of a vehicle and the controller may control the drone or provide the drone with information necessary to take off or land the drone so that the drone takes off from or lands on the seat part in a rearward direction of the roof of the vehicle, when the drone takes off or lands.

In accordance with another aspect of the present disclosure, a method for operating the docking system for drones is provided. The method includes sensing whether or not the drone is hung on the wire and landing the drone at the target position of the seat part by controlling the tension of the wire through the tension adjusters when the drone is hung on the wire.

The method may further include locking the drone to the seat part through a magnetic unit provided in the seat part, after the landing the drone at the target position of the seat part.

The method may further include replacing a battery of the drone or an object transported by the drone via a through hole formed in the seat part, after locking the drone to the seat part.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION OF THE EMBODIMENTS

Reference is now made in detail to the embodiments of the present disclosure, examples of which are illustrated in the accompanying drawings. Wherever possible, the same reference numbers are used throughout the drawings to refer to the same or like parts. Further, the terms "part," "unit," "module," or the like may be used herein to mean a unit for processing at least one function or operation. Such a part, unit, module, or the like may be implemented by hardware, software, or a combination of hardware and software. When a part, unit, module, or the like of the present disclosure is described as having a purpose or performing an operation, function, or the like, the part, unit, module, or the like should be considered herein as being "configured to" meet that purpose or to perform that operation, function, or the like. Further, the controller described herein may include a processor programmed to perform the noted operations, functions, controls, or the like.

Figure 1:
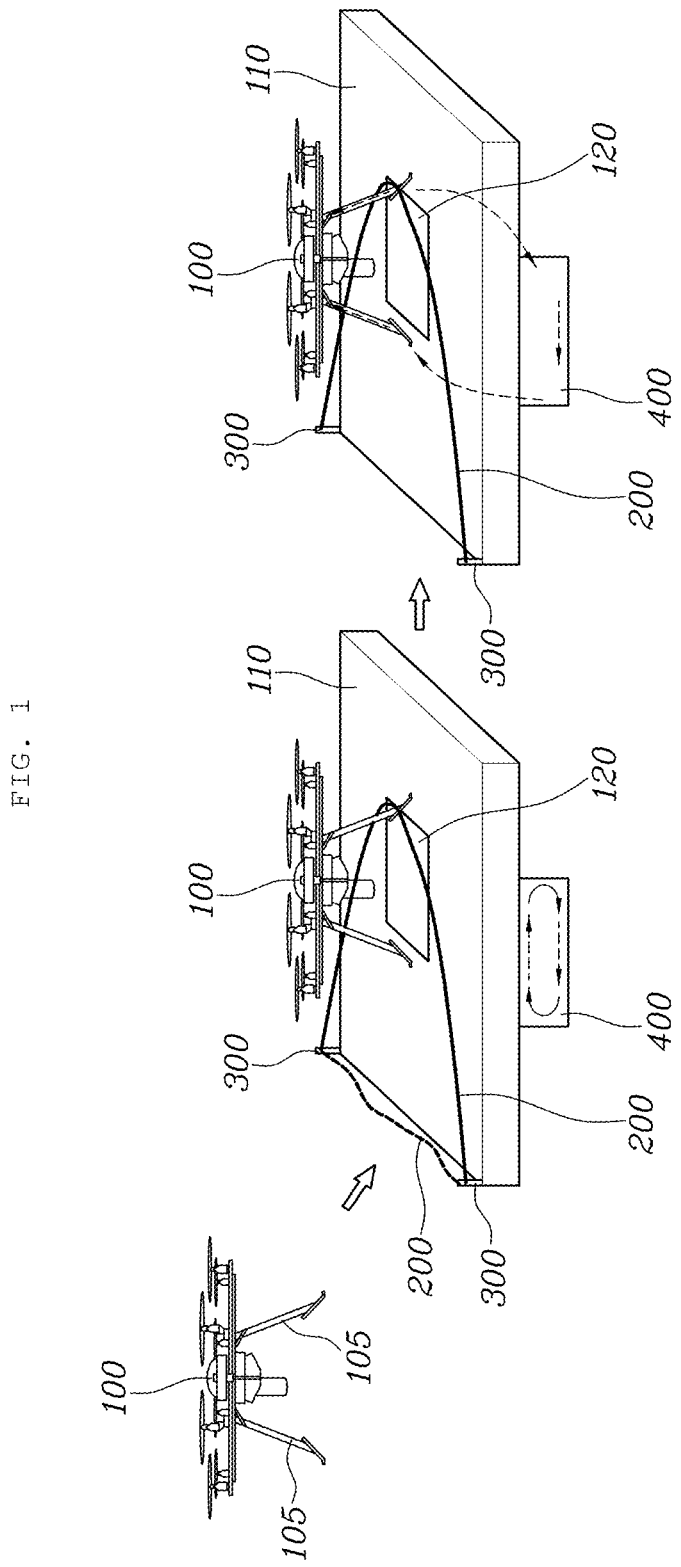
FIG. 1 is a view illustrating landing of a drone on a seat part and fixation of the drone thereto in a docking system for drones according to one embodiment of the present disclosure.
Figure 2:
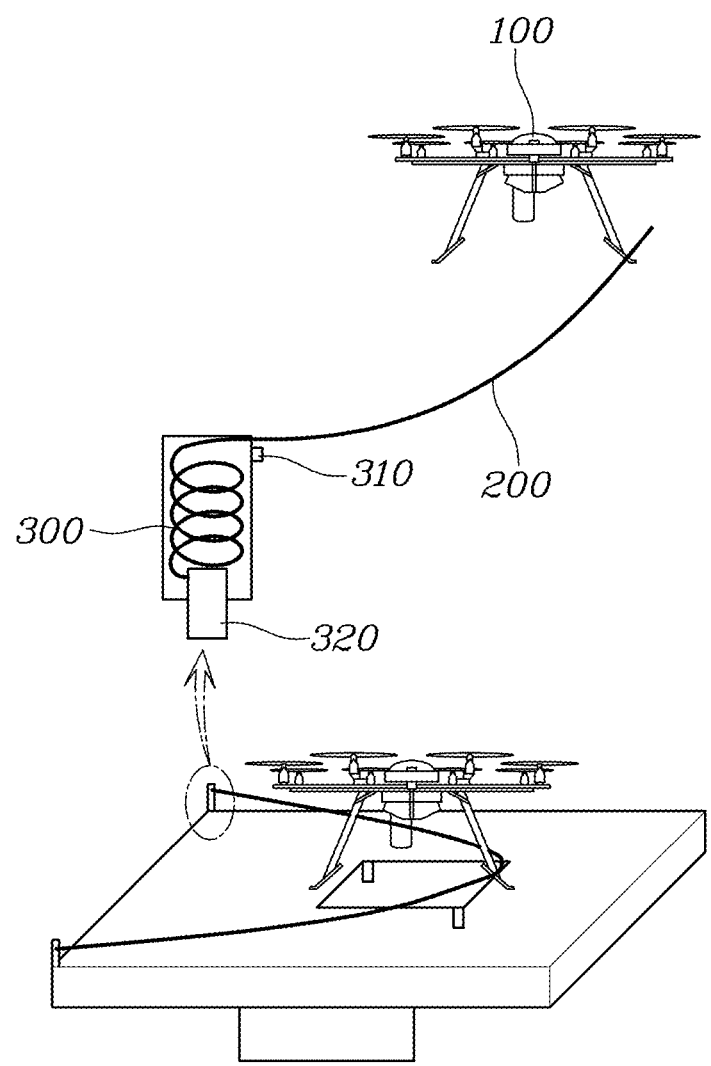
FIG. 2 is a view illustrating adjustment of the tension of a wire by tension adjusters in the docking system for drones according to one embodiment of the present disclosure.

Referring to FIG. 1 and FIG. 2, the docking system for drones according to one embodiment of the present disclosure includes a seat part 110 on which a drone 100 lands and a wire 200 provided on the seat part 110 and configured to allow the landing drone 100 to be caught thereby or hung up, i.e., hung thereon so that the drone 100 may land on the seat part 110. The docking system also includes tension adjusters 300 configured to adjust the tension of the wire 200 so as to allow the drone 100 to land at a target position of the seat part 110 when the drone 100 is hung on the wire 200.

In more detail, the docking system for drones according to one embodiment of the present disclosure uses the wire 200 and the tension adjusters 300 in order to land the drone 100 precisely at the target position. When the flying drone 100 is hung on the wire 200, the tension of the wire 200 is increased, and therefore, the tension adjusters 300 wind the wire 200 to reduce the speed of the drone 100. The drone 100 moves forwards before reaching the target position, and the tension adjusters 300 adjust the tension of the wire 200 until the drone 100 reaches the target position.

In addition, the docking system for drones according to one embodiment of the present disclosure may further include a controller 120 configured to control the drone 100 or to provide the drone 100 with information necessary to land the drone 100 so as to land the drone 100 on the seat part 110 through the tension adjusters 300, when the drone 100 lands. The controller 120 may be provided in the seat part 110 or the tension adjusters 300. When the drone 100 is fixed to a specific point of the seat part 100 or is continuously moved, the controller 120 controls the drone 100 or provides the drone 100 with the information necessary to land the drone 100, and may thus allow the drone 100 to be hung on the wire 200 provided on the seat part 110 so as to land precisely at the target position of the seat part 110.

A position sensor is provided at the target position of the seat part 110. The controller 120 or the tension adjusters 300 determine whether or not the drone 100 lands on the seat part 110 and is located precisely at the target position and fix the drone 100 to the seat part 110 using a magnetic unit upon determining that the drone 100 is located precisely at the target position. Upon determining that the drone 100 is not located precisely at the target position, the controller 120 controls the drone 100 or provides the drone 100 with information necessary to change the landing position of the drone 100, or the tension adjusters 300 adjust the tension of the wire 200, so that the drone 100 is located at the target position of the seat part 110.

In the docking system for drones according to one embodiment of the present disclosure, when the drone 100 lands, a landing gear 105 is extended and hung on the wire 200 so that the drone 100 may land on the seat part 110. Further, in the docking system for drones according to one embodiment of the present disclosure, when the drone 100 takes off, the wire 200, on which the landing gear 105 is hung, is released from the landing gear 105 so that the drone 100 may take off from the seat part 110. In general, a driver is provided in the upper portion of the drone 100 and the landing gear 105 for landing is provided at the lower end of the drone. Therefore, when the drone lands, the wire 200 is caught on the landing gear 105 of the drone 100, the tension of the wire 200 is adjusted, and thereby, the drone 100 lands at the target position of the seat part 110. When the drone 100 takes off, the wire 200 caught on the landing gear 105 of the drone 100 is released, and thereby, the drone 100 takes off in the landing direction of the drone 100.

Further, in the docking system for drones according to one embodiment of the present disclosure, the tension adjuster 300 may include a tension sensor 310 configured to measure the tension of the wire 200 and a motor 320 configured to wind the wire 200 on the tension adjuster 300 depending on the measured tension of the wire 200. The tension adjuster 300 adjusts the tension of the wire 200 by winding or unwinding the wire 200 by controlling the motor 320. The wire 200 is stretched or unwound so as to increase the tension thereof when the wire 200 is caught on the landing gear 105. Here, because the length of the wire 200 or the tension withstood by the wire 200 is limited, the tension adjuster 300 decelerates the drone 100 through the wire 200 while adjusting the tension of the wire 200 so that the tension of the wire 200 does not exceed the limit thereof.

Figure 3:
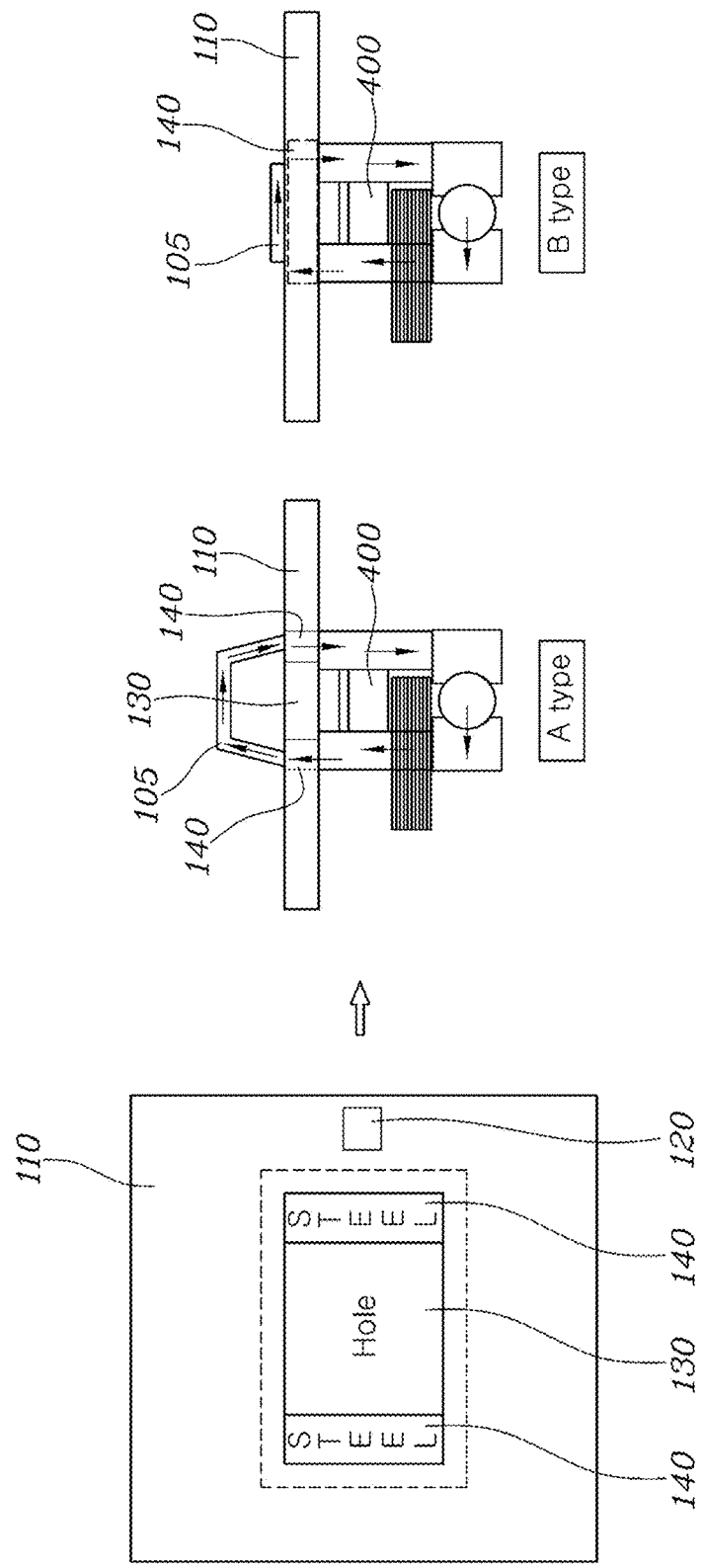
FIG. 3 is a view illustrating fixation of the drone to the seat part through a magnetic unit of the drone in the docking system for drones according to one embodiment of the present disclosure.

FIG. 3 is a view illustrating fixation of the drone to the seat part through a magnetic unit of the drone in the docking system for drones according to one embodiment of the present disclosure. In the docking system for drones according to one embodiment of the present disclosure, a magnetic unit 400 may be provided in the seat part 110, and the magnetic unit 400 may lock the drone 100 to the seat part 110 when the drone 100 lands at the target position. Further, in the docking system for drones according to one embodiment of the present disclosure, fixing parts 140, with which parts of the landing gear 105 of the drone 100 come into contact, may be provided at the target position of the seat part 110, the parts of the landing gear 105 of the drone 100 and the fixing parts 140 may be formed of a material having magnetism, i.e., a magnetic material. The magnetic unit 400 may be disposed to turn towards the fixing parts 140 so as to form a magnetic flux path.

The drone 100 lands at the target position of the seat part 110 by allowing the parts of the landing gear 105 to be hung on the wire 200. After landing, the drone 100 stops operation and is fixed to the seat part 110 by magnetic force of the magnetic unit 400. Here, the landing gear 105 of the drone 100 may be locked to the fixing parts 140 when the magnetic flux path is formed along the magnetic unit 400, the landing gear 105 of the drone 100, and the fixing parts 140. The landing gear 105 of the drone 100 may be unlocked from the fixing parts 140 when the magnetic flux path is formed along the magnetic unit 400 alone.

Further, referring to FIG. 3, the magnetic unit 400 may form a magnetic flux path along the entirety of the fixing parts 140 and a plurality of parts of the landing gear 105 of the drone 100 so as to lock the drone 100 (A type). Alternatively, a plurality of magnetic units 400 may be provided to correspond to the respective parts of the landing gear 105. Each magnetic unit 400 may form a magnetic flux path along the corresponding fixing part 140 and the bottom surface of the corresponding part of the landing gear 105, which comes into contact with the fixing part 140, so as to lock the respective parts of the landing gear 105 to the corresponding fixing parts 140 (B type).

The magnetic unit 400 may include a stationary permanent magnet having a ring shape and provided within the magnetic unit 400 so as to come into contact with the fixing parts 140 and may include an electromagnet provided within the magnetic unit 400 opposite the fixing parts 140. The respective parts of the landing gear 105 may be locked to or unlocked from the fixing parts 140 based on a change in the polarity of the electromagnet. In other words, the magnetic unit 400 forms a magnetic flux path by applying current to the electromagnet. The magnetic flux path formed by the magnetic unit 400 is changed depending on a change in the polarity of the electromagnet.

In more detail, when the electromagnet of the magnetic unit 400 is given the same polarity as that of the stationary permanent magnet at the interface therebetween by applying current to the electromagnet, the magnetic flux path is formed so as to pass through the magnetic unit 400, the fixing parts 140, and the landing gear 105 of the drone 100. Thereby, the respective parts of the landing gear 105 of the drone 100 are locked to the fixing parts 140. When the electromagnet of the magnetic unit 400 is given a polarity different from that of the stationary permanent magnet at the interface therebetween by applying current to the electromagnet, the magnetic flux path is formed so as to pass through the magnetic unit 400 and not to pass through the fixing parts 140 and the landing gear 105 of the drone 10. Thereby, the respective parts of the landing gear 105 of the drone 100 are unlocked from the fixing parts 140.

Further, even when application of current is stopped after the respective parts of the landing gear 105 are locked to or unlocked from the fixing parts 140 through the magnetic flux path formed by applying current to the electromagnet of the magnetic unit 400, the magnetic fluid path, which was already formed, is maintained. Thus, the locked state or unlocked state of the landing gear 105 of the drone 100 to or from the fixing parts 140 is maintained. Therefore, if a locking mechanism is implemented on rails using the magnetic unit 400, current may be supplied to the magnetic unit 400 only at the moment when the respective parts of the landing gear 105 are locked to or unlocked from the fixing parts 140. Thereby, power consumption may be minimized.

Further, in the docking system for drones according to one embodiment of the present disclosure, an electromagnetic sensor and a locking checking unit are provided in the magnetic unit 400 or the fixing parts 140. The electromagnetic sensor is configured to measure voltage due to the magnetic flux path. The locking checking unit is configured to determine that the drone 100 is locked normally at the target position when the measured voltage satisfies a designated reference level. Upon determining that the drone 100 is not located normally at the target position, the controller 120 may again control the drone 100 or may provide the drone 100 with information necessary to lock the drone 100 and request a solution of such a problem from a system manager. The tension adjusters 300 may reset the position of the drone 100 through the wire 200.

Figure 4:
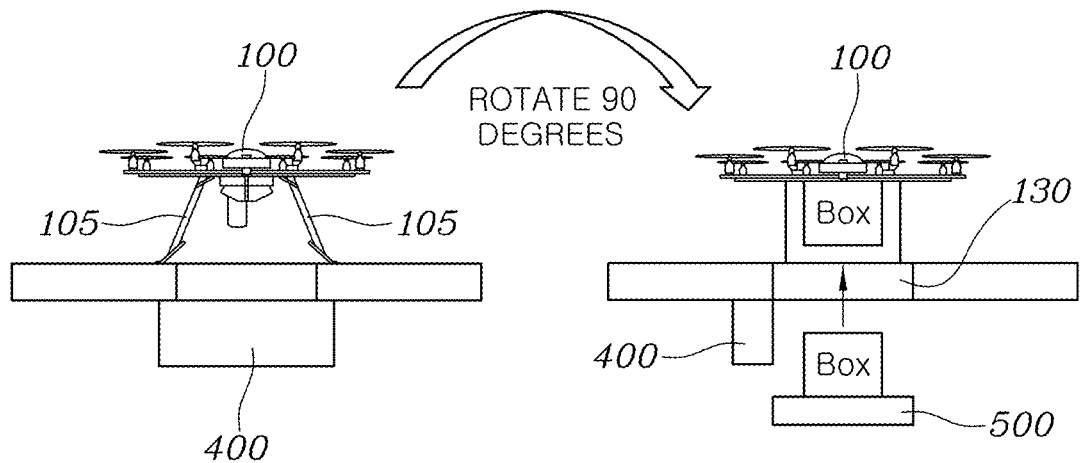
FIG. 4 is a view illustrating mounting of an object on the drone via a through hole formed in a target position of the seat part in the docking system for drones according to one embodiment of the present disclosure.

FIG. 4 is a view illustrating mounting of an object on the drone via a through hole formed in the target position of the seat part in the docking system for drones according to one embodiment of the present disclosure. In the docking system for drones according to one embodiment of the present disclosure, a through hole 130, which is selectively opened, is formed in the target position of the seat part 110. When the drone 100 lands at the target position of the seat part 110, a battery of the drone 100 may be replaced or an object transported by the drone 100 may be replaced. Further, in the docking system for drones according to one embodiment of the present disclosure, the width of the through hole 130 is less than the distance between the parts of the landing gear 105 of the drone 100 so that the battery of the drone 100 or the object transported by the drone 100 may be replaced between the parts of the landing gear 105 of the drone 100.

In more detail, if a transport pallet 500 is provided under the through hole 130, the transport pallet 500 lifts a new battery for the drone 100 or an object desired to be transported by the drone 100 (i.e., a 'box' in FIG. 4), the through hole 130 is opened, and the battery of the drone 100 or the object transported by the drone 100 is replaced with the new one between the parts of the landing gear 105 of the drone 100.

Further, in the docking system for drones according to the present disclosure, the seat part 110 may be provided on the roof of a vehicle, and the controller 120 may control the drone 100 to take off or land or provide the drone 100 with information necessary to take off or land the drone 100 when the drone takes off or lands. In other words, when the seat part 110 is provided on the roof of the vehicle, the drone 100 may pick up an object or replace the battery thereof with a new one via the through hole 130 precisely at the target position of the seat part 110 on the roof of the moving vehicle. In this case, the wire 200 and the tension adjusters 300 are provided on the rear portion of the vehicle. Thus, the drone 100 flies from the rear of the vehicle and lands on the seat part 110, and then takes off from the seat part 110 toward the rear of the vehicle so as to release the wire 200 from the drone 100.

Figure 5:
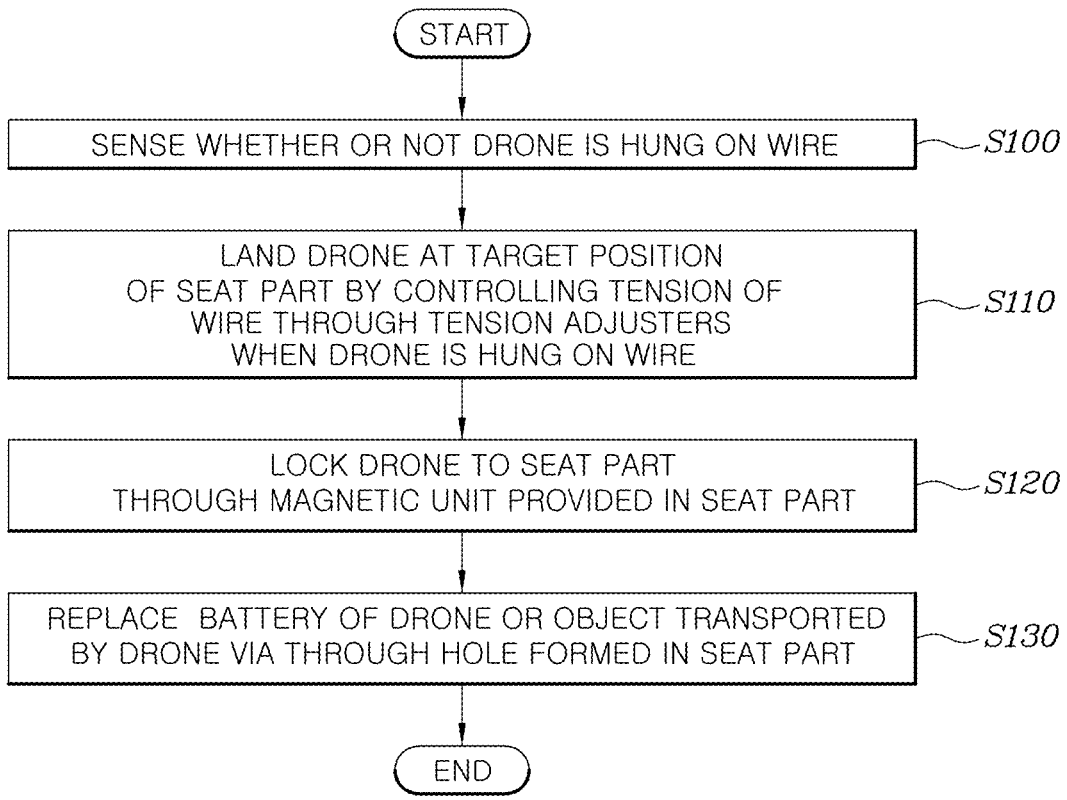
FIG. 5 is a flowchart illustrating a method for operating a docking system for drones according to one embodiment of the present disclosure.

FIG. 5 is a flowchart illustrating a method for operating a docking system for drones according to one embodiment of the present disclosure. The method includes sensing whether or not a drone is hung on a wire (S100) and landing the drone at a target position of a seat part by controlling the tension of the wire through tension adjusters when the drone is hung on the wire (S110).

Further, the method according to one embodiment of the present disclosure may further include locking the drone to the seat part through a magnetic unit provided in the seat part (S120), after landing the drone at the target position of the seat part (S110).

In addition, the method according to one embodiment of the present disclosure may further include replacing a battery of the drone or an object transported by the drone via a through hole formed in the seat part (S130), after locking the drone with the seat part (S120).

As is apparent from the above description, in a docking system for drones and a method for operating the same according to the present disclosure, a seat part is provided at a specific fixed point or a specific moving point, such as a vehicle. A drone is caught or hung up, i.e., hung on a wire provided on the seat part when the drone lands on the seat part. Tension adjusters adjust the tension of the wire so as to allow the drone to land at a target position of the seat part when the drone is hung on the wire. The drone is fixed to the seat part using magnetic force.

Although specific embodiments of the present disclosure have been disclosed for illustrative purposes, those having ordinary skill in the art should appreciate that various modifications, additions, and substitutions are possible, without departing from the scope and spirit of the disclosure as disclosed in the accompanying claims.

What is claimed is:

1. A docking system for a drone, the docking system comprising:
    a seat part configured to land a drone thereon;
    a wire provided on the seat part and configured to allow a landing gear of the drone to be hung on the wire so that the drone may land on the seat part;
    tension adjusters configured to adjust tension of the wire so as to allow the drone to land at a target position of the seat part when the drone is hung on the wire; and
    a controller configured to
        control the drone or to provide the drone with information necessary to land the drone so as to allow the drone, when the drone lands, to land on the seat part through the tension adjusters,
        sense whether or not the drone is hung on the wire, and
        land the drone at the target position of the seat part by controlling the tension of the wire through the tension adjusters when the drone is hung on the wire.

2. The docking system according to claim 1 wherein the seat part is provided on a roof of a vehicle, and wherein the controller controls the drone or provides the drone with information necessary to take off or land the drone so that the drone takes off from or lands on the seat part in a rearward direction of the roof of the vehicle, when the drone takes off or lands.

3. The docking system according to claim 1, wherein, when the drone lands, the landing gear is extended and hung on the wire so that the drone lands on the seat part.

4. The docking system according to claim 3, wherein, when the drone takes off, the wire on which the landing gear is hung is released from the landing gear so that the drone takes off from the seat part.

5. The docking system according to claim 1, wherein each of the tension adjusters comprises a tension sensor configured to measure the tension of the wire and a motor configured to wind the wire on the tension adjuster depending on the measured tension of the wire.

6. The docking system according to claim 1, wherein a magnetic unit is provided in the seat part, and wherein the magnetic unit locks the drone to the seat part when the drone lands at the target position.

7. The docking system according to claim 6, wherein a fixing part configured such that the landing gear of the drone comes into contact therewith is provided at the target position of the seat part, wherein the landing gear of the drone and the fixing part are formed of a material having magnetism, and wherein the magnetic unit is disposed relative to the fixing part so as to form a magnetic flux path.

8. The docking system according to claim 7, wherein the landing gear of the drone is locked to the fixing part when the magnetic flux path is formed along the magnetic unit, the landing gear of the drone, and the fixing part, and wherein the landing gear of the drone is unlocked from the fixing part when the magnetic flux path is formed in the magnetic unit alone.

9. The docking system according to claim 8, wherein the magnetic unit or the fixing part is configured to measure voltage due to the magnetic flux path, and is configured to determine that the drone is locked at the target position when the measured voltage satisfies a designated reference level.

10. The docking system according to claim 1, wherein a through hole is formed in the target position of the seat part and, when the drone lands at the target position of the seat part, a battery of the drone is replaced or an object transported by the drone is replaced.

11. The docking system according to claim 10, wherein a pair of the landing gear is provided, and wherein a width of the through hole is less than a distance between the pair of the landing gear of the drone, and wherein the battery of the drone or the object transported by the drone is replaced between the pair of the landing gear of the drone.

12. A method for operating a docking system, the docking system having a seat part configured to land a drone thereon, a wire provided on the seat part and configured to allow the landing drone to be hung on the wire so that the drone may land on the seat part, and tension adjusters configured to adjust tension of the wire so as to allow the drone to land at a target position of the seat part when the drone is hung on the wire, the method comprising:
    sensing whether or not the drone is hung on the wire; and
    landing the drone at the target position of the seat part by controlling the tension of the wire through the tension adjusters when the drone is hung on the wire.

13. The method according to claim 12, further comprising locking the drone to the seat part through a magnetic unit provided in the seat part, after the drone has landed at the target position of the seat part.

14. The method according to claim 13, further comprising replacing a battery of the drone or an object transported by the drone via a through hole formed in the seat part, after the locking the drone to the seat part.

* * * * *